US009379607B2

(12) United States Patent
Chiu et al.

(10) Patent No.: US 9,379,607 B2
(45) Date of Patent: Jun. 28, 2016

(54) CONTROL MODULE OF CONSTANT ON-TIME MODE AND VOLTAGE CONVERTING DEVICE THEREOF

(71) Applicant: Anpec Electronics Corporation, Hsin-Chu (TW)

(72) Inventors: Liang-Hsiang Chiu, Hsinchu County (TW); Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 145 days.

(21) Appl. No.: 14/190,055

(22) Filed: Feb. 25, 2014

(65) Prior Publication Data

US 2015/0162829 A1    Jun. 11, 2015

(30) Foreign Application Priority Data

Dec. 6, 2013  (TW) .............................. 102144917 A (51) Int. Cl.
 *G05F 1/00* (2006.01)
 *H02M 3/156* (2006.01)
 *H02M 1/00* (2006.01)

(52) U.S. Cl.
 CPC ...... *H02M 3/156* (2013.01); *H02M 2001/0032* (2013.01); *Y02B 70/16* (2013.01)

(58) Field of Classification Search
 CPC ......... H02M 3/06; H02M 3/07; H02M 3/155; H02M 3/156; H02M 3/1563; H02M 3/1566; H02M 3/157; H02M 3/158; H02M 1/08; H02M 1/14; H02M 1/143; H02M 1/15; H02M 2001/0009; H02M 2001/0025; H02M 2001/0032; H02M 3/1588; Y02B 70/16

USPC ................. 323/205–211, 222–226, 271–276, 323/280–288, 311–313, 351; 363/44–48, 363/123–127; 327/131–140
See application file for complete search history.

(56) References Cited

U.S. PATENT DOCUMENTS

| 2004/0150439 | A1* | 8/2004 | Greenfeld | ............... | H02M 1/38 327/131 |
| 2005/0018458 | A1* | 1/2005 | Shimada | ............. | H02M 1/4225 363/125 |
| 2011/0234188 | A1* | 9/2011 | Chiu | ....................... | H02M 1/14 323/282 |
| 2011/0260703 | A1* | 10/2011 | Laur | ................... | H02M 3/1563 323/271 |
| 2012/0049826 | A1 | 3/2012 | Hsu | | |

FOREIGN PATENT DOCUMENTS

| CN | 202889198 U | 4/2013 |
| TW | 201037950 | 10/2010 |
| TW | M460455 | 8/2013 |

\* cited by examiner

*Primary Examiner* — Timothy J Dole
*Assistant Examiner* — Carlos Rivera-Perez
(74) *Attorney, Agent, or Firm* — Winston Hsu; Scott Margo (57) ABSTRACT

A control module of constant on-time mode for a voltage converting device, includes a comparing unit, for generating a comparing signal according to an enhanced feedback voltage and a comparing voltage; a feedback voltage generating unit, for generating the enhanced feedback voltage according to a voltage difference between a first reference voltage and a feedback voltage corresponding to an output voltage of the voltage converting device; a comparing voltage generating unit, for generating the comparing voltage according to a second reference voltage and a control signal; and a adjusting unit, for acquiring an average voltage of the enhanced feedback voltage and adjusting the first reference voltage according to a voltage difference between the average voltage and the second reference voltage.

6 Claims, 7 Drawing Sheets

CONTROL MODULE OF CONSTANT ON-TIME MODE AND VOLTAGE CONVERTING DEVICE THEREOF

BACKGROUND OF THE INVENTION

1. Field of the Invention

The present invention relates a control module of constant on-time mode and voltage converting device thereof, and more particularly, to a control module of constant on-time mode capable of operating under different switching frequencies and voltage converting device thereof.

2. Description of the Prior Art

Electronic devices are usually comprised of many different elements, which operate with different operational voltages. It is necessary to utilize different DC-DC voltage converters in order to achieve different voltage modulations, such as modulation for raising voltage values or degradation voltage values, and to maintain predetermined voltage values. Many types of DC-DC voltage converters which are widely employed are derived from the buck/step down converter or the boost/step up converter. The buck converter can decrease an input DC voltage to a default voltage level, and the boost converter can increase the input DC voltage to another default voltage level. Both the buck and boost-type converters have been varied and modified to conform to different system architectures and requirements.

Figure 1:
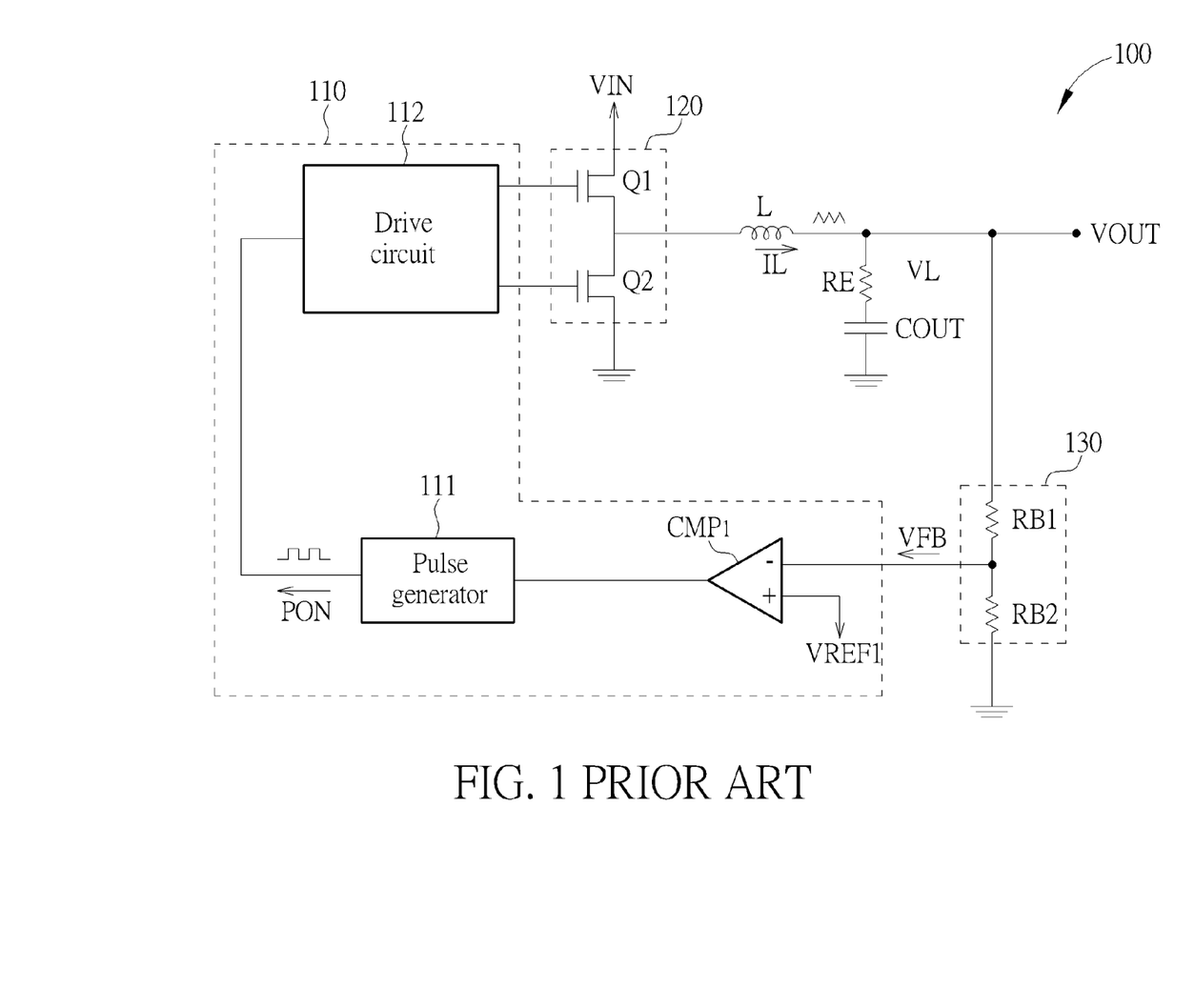
FIG. 1 is a schematic diagram of a conventional DC/DC convertor.

Please refer to FIG. 1. FIG. 1 is a diagram illustrating a conventional bulk DC/DC converter 100. The bulk DC/DC converter 100 converts an input voltage source VIN to be an output voltage source VOUT, wherein the voltage VOUT is lower than the voltage VIN. As shown in FIG. 1, the DC/DC converter 100 comprises a control circuit 110, a switch set 120, an inductor L, an output capacitor COUT, and a voltage-dividing set 130. The switch set 120 comprises two switches Q1 and Q2. The voltage-dividing set 130 comprises two voltage-dividing resistors RB1 and RB2. The control circuit 110 comprises a comparator CMP1, a pulse generator 111, and a drive circuit 112. The operation principles of the bulk DC/DC converter 100 are described as follows.

The control circuit 110 controls the operation of the DC/DC converter 100 by constant on-time manner. That is, when the control circuit 110 detects the output voltage VOUT is lower than a predetermined value, the switch Q1 is turned on for a constant period of time (constant on-time) by the control circuit 110 (while the switch Q2 is turned off) for allowing the input voltage source VIN conducting to the inductor L through the switch set 120.

During the operation of the DC/DC converter 100, the inductor L carries current IL, and the current IL flows into the equivalent serial resistor RE of the output capacitor COUT so that the resistor RE carries voltage VL reflecting the current IL. As shown in FIG. 1, the waveform of the voltage VL is saw-toothed because the switch Q1 is periodically turned on/off. The comparator CMP1 receives the feedback voltage VFB divided from the voltage VL and the output voltage VOUT by the resistors RB1 and RB2, and compares with a reference voltage VREF1, so as to determine when to turn on the switch Q1. More specifically, when the voltage (feedback voltage VFB) on the negative input end of the comparator CMP1 is lower than the voltage (reference voltage VREF1) on the positive input end of the comparator CMP1, which means the output voltage VOUT is too low, and the switch Q1 is needed to be turned on for allowing the input voltage source VIN to charge the inductor L and the output capacitor COUT, the comparator CMP1 controls the pulse generator 111 to generate a pulse signal PON. When the pulse generator 111 is triggered by the comparator CMP1, the pulse generator 111 generates a pulse signal PON with a predetermined duration TP and predetermined logic. The drive circuit 112 controls the switch set 120 according to the pulse signal PON. More particularly, when the drive circuit 112 receives the pulse signal PON, the switch Q1 is driven to turn on for the predetermined duration TP. In addition, except in the dead time both of the switches Q1 and Q2 are turned off, when the switch Q1 is turned on, the switch Q2 is turned off; when the switch Q1 is turned off, the switch Q2 is turned on. In this way, the control circuit 110 controls the DC/DC converter 100 to operate regularly in constant on-time mode.

However, not all kinds of capacitors definitely have equivalent serial resistors, and because of the improvement to the manufacture of capacitors, the equivalent serial resistances of the capacitors become smaller, or even do not exist. For example, the multi-layer ceramic capacitor (MLCC) is very similar to an ideal capacitor and therefore the equivalent serial resistor does not exist on the MLCC. Consequently, when the MLCC is utilized as the output capacitor COUT, the resistor RE does not exist, and thus the information of the current IL cannot be informed to the control circuit 110, causing the control circuit 110 unable to control the DC/DC converter 100 according to the voltage VL effectively. The control circuit 110 is still able to operate by the feedback of the output voltage VOUT. However, the phase of the output voltage VOUT is far behind the phase of the voltage VL because of the output capacitor COUT, which makes the control circuit 110 unable to react to the variation of the output voltage VOUT in time. For this reason, the DC/DC converter 100 is not able to operate stably in constant on-time mode while utilizing the MLCC as the output capacitor, causing inconvenience.

SUMMARY OF THE INVENTION

In order to solve the above problem, the present invention provides a control module of the constant on-time mode capable of operating under different switching frequencies and voltage converting device thereof.

The present invention discloses a control module of constant on-time mode for a voltage converting device, the control module comprising a comparing unit, comprising a first positive input end, for receiving an enhanced feedback voltage; a first negative input end, for receiving a comparing voltage; and a first output end, for generating a comparing signal; a feedback voltage generating unit, for generating the enhanced feedback voltage according to a voltage difference between a first reference voltage and a feedback voltage corresponding to an output voltage of the voltage converting device; a comparing voltage generating unit, comprising a first resistor, coupled between the first negative input end and a second reference voltage; a first capacitor, coupled to between the first negative input end and the ground; a current source, coupled to the first negative input end and a first end; and a switch, for controlling the connection between the first end and the ground according to a control signal; and an adjusting unit, coupled to the first positive input end and the second reference voltage for acquiring an average voltage of the enhanced feedback voltage and adjusting the first reference voltage according to a voltage difference between the average voltage and the second reference voltage.

The present invention further discloses a voltage converting device, comprising a voltage converting module, for generating an output voltage according to a driving signal and an input voltage and generating a feedback voltage according to the output voltage; a driving module, for generating the driving signal and a control signal according to a comparing signal; and a control module, comprising a comparing unit, comprising a first positive input end, for receiving an enhanced feedback voltage; a first negative input end, for receiving a comparing voltage; and a first output end, for generating a comparing signal; a feedback voltage generating unit, for generating the enhanced feedback voltage according to a voltage difference between a first reference voltage and a feedback voltage corresponding to an output voltage of the voltage converting device; a comparing voltage generating unit, comprising a first resistor, coupled between the first negative input end and a second reference voltage; a first capacitor, coupled to between the first negative input end and the ground; a current source, coupled to the first negative input end and a first end; and a switch, for controlling the connection between the first end and the ground according to a control signal; and an adjusting unit, coupled to the first positive input end and the second reference voltage for acquiring an average voltage of the enhanced feedback voltage and adjusting the first reference voltage according to a voltage difference between the average voltage and the second reference voltage.

The present invention further discloses a control module of constant on-time mode for a voltage converting device, the control module comprising a comparing unit, comprising a first positive input end, for receiving an enhanced feedback voltage; a first negative input end, for receiving a comparing voltage; and a first output end, for generating a comparing signal; a feedback voltage generating unit, for generating the enhanced feedback voltage according to a voltage difference between a first reference voltage and a feedback voltage corresponding to an output voltage of the voltage converting device; a comparing voltage generating unit, comprising a first resistor, coupled between the first negative input end and a second reference voltage; a first capacitor, coupled to between the first negative input end and the ground; a current source, coupled to the first negative input end and a first end; and a switch, for controlling the connection between the first end and the ground according to a control signal; and an adjusting unit, coupled to the first negative input end and the second reference voltage for detecting an average of the current passing through the first resistor as an average current and adjusting the enhanced feedback voltage according to the average current.

The present invention further discloses a voltage converting device, comprising a voltage converting module, for generating an output voltage according to a driving signal and an input voltage and generating a feedback voltage according to the output voltage; a driving module, for generating the driving signal and a control signal according to a comparing signal; and a control module, comprising a comparing unit, comprising a first positive input end, for receiving an enhanced feedback voltage; a first negative input end, for receiving a comparing voltage; and a first output end, for generating a comparing signal; a feedback voltage generating unit, for generating the enhanced feedback voltage according to a voltage difference between a first reference voltage and a feedback voltage corresponding to an output voltage of the voltage converting device; a comparing voltage generating unit, comprising a first resistor, coupled between the first negative input end and a second reference voltage; a first capacitor, coupled to between the first negative input end and the ground; a current source, coupled to the first negative input end and a first end; and a switch, for controlling the connection between the first end and the ground according to a control signal; and an adjusting unit, coupled to the first negative input end and the second reference voltage for detecting an average of the current passing through the first resistor as an average current and adjusting the enhanced feedback voltage according to the average current.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
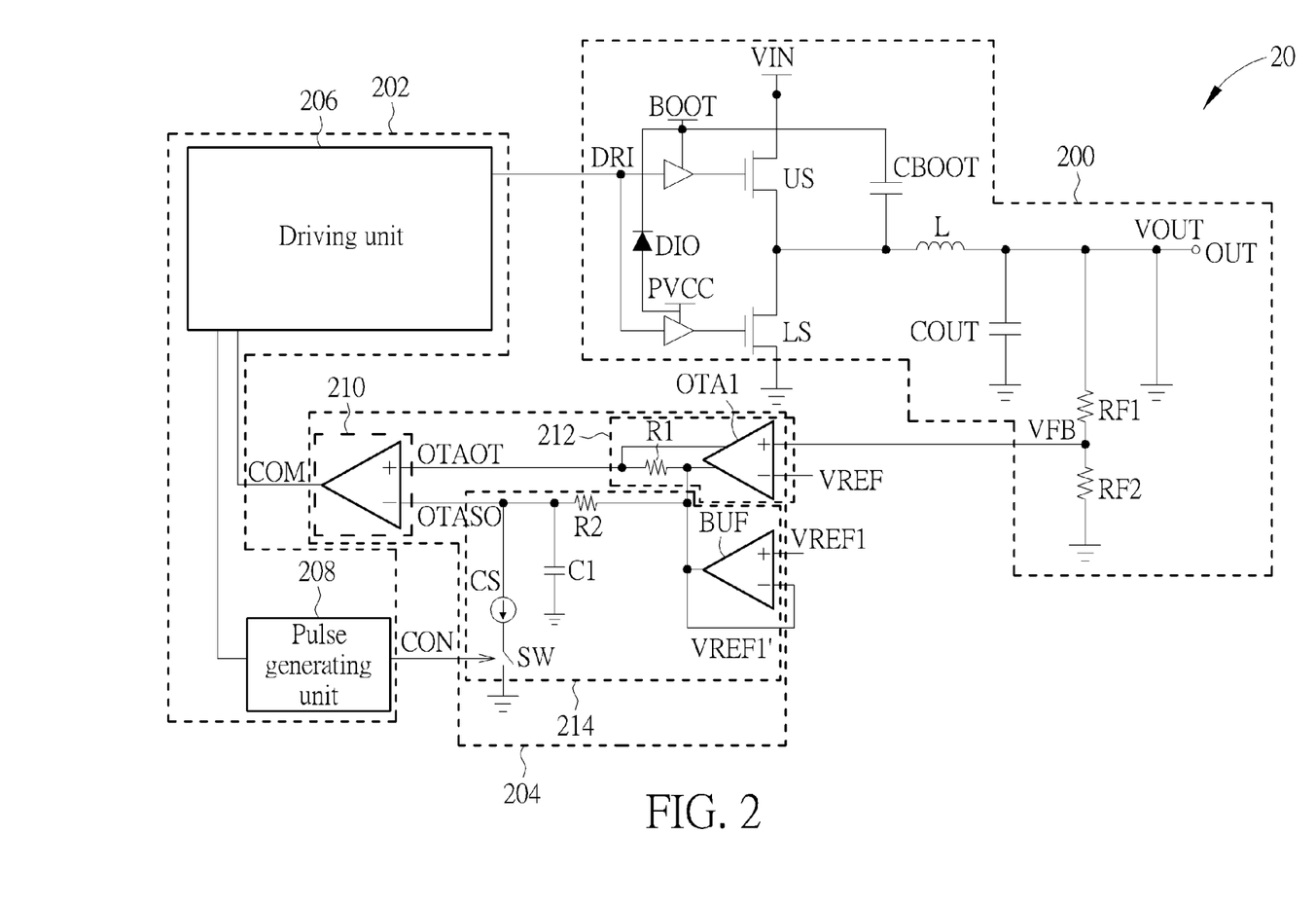
FIG. 2 is a schematic diagram of a voltage converting device according to an example of the present invention.

Please refer to FIG. 2, which is a schematic diagram of a voltage converting device 20 according to an example of the present invention. The voltage converting device 20 may be a voltage convertor realized in the constant on-time mode. As shown in FIG. 2, the voltage converting device 20 comprises a voltage converting module 200, a driving module 202 and a control module 204. The voltage converting module 200 comprises a high side switch US, a low side switch LS, a diode DIO, a boot-strap capacitor CBOOT, an inductor L, an output capacitor COUT and resistors RF1 and RF2. The voltage converting module 200 generates an output voltage VOUT according to a driving signal DRI and an input voltage VIN and generates a feedback voltage VFB according to the output voltage VOUT and a ratio between the resistances of the resistors RF1 and RF2. The driving module 202 comprises a driving unit 206 and a pulse generating unit 208, for generating the driving signal DRI used for controlling the high side switch US and the low side switch LS and a control signal CON according to a comparing signal COM. The control module 204 comprises a comparing unit 210, a feedback voltage generating unit 212 and a comparing voltage generating unit 214, for generating the comparing signal COM according to the feedback voltage VFB, reference voltages VREF and VREF1 and the control signal CON. Via the feedback path composed of the voltage converting module 200, the driving module 202 and the control module 204, the voltage converting device 20 can generate the accurate and stable output voltage VOUT.

In details, the control module 204 controls the driving module 202 via the constant on-time mode. When the comparing unit 210 detects an enhanced feedback voltage OTAOT is lower than a comparing voltage OTASO, the output voltage VOUT is lower than a predetermined value. The comparing unit 210 of the control module 204 adjusts the comparing signal COM for making the driving unit 206 of the driving module 202 switch the driving signal DRI, so as to conduct the high side switch US and disconnect the low side switch LS for a time period TON. In such a condition, the input voltage VIN charges the output capacitor COUT through the high side switch US and the inductor L in the time period TON, to increase the output voltage VOUT. After the time period TON, the driving unit 206 of the driving module 202 switches the driving signal DRI to disconnect the high side switch US and conducts the low side switch LS.

Since the output capacitor COUT does not have equivalent series resistance (ESR) (e.g. the output capacitor COUT is a Multi-layer Ceramic Capacitor (MLCC)), the voltage converting device 20 cannot use the conventional method to detect the inductor current IL passing through the inductor L and to control the time of conducting the high side switch US. Thus, the control module 204 needs to utilize the virtual ripple method for generating the comparing signal COM.

First, the feedback voltage generating unit 212 utilizes an amplifier OTA1 and a resistor R1 to amplify the voltage difference between the feedback voltage VFB and the reference voltage VREF, for acquiring the enhanced feedback voltage OTAOT. When the driving module 202 switches the driving signal DRI for conducting the high side switch US, the driving module 202 also generates a pulse with the time period TON1 on the control signal CON for conducting a switch SW of the comparing voltage generating unit 214. In such a condition, a current source CS of the comparing voltage generating unit 214 discharges the comparing voltage OTASO for the time period TON1. The comparing voltage OTASO becomes smaller than the enhanced voltage OTAOT when the driving unit 206 conducts the high side switch US, and the comparing unit 210 therefore switches the comparing signal COM. After the time period TON1, the switch SW is disconnected and the current source CS stops discharging. The voltage buffer BUF generates the reference voltage VREF1' according to the reference voltage VREF1 (the reference voltage VREF1 is equaled to the reference voltage VREF1') and increases the comparing voltage OTASO via the resistor R2 and the capacitor C1. When the comparing voltage OTASO exceeds the enhanced feedback voltage OTAOT, the comparing unit 210 switches the comparing COM again, for making the driving unit 206 of the driving module 202 switch the driving signal DRI, so as to conducts the high side switch US and disconnect the low side switch LS for the time period TON.

In other words, when the pulse is generated on the control signal CON, the high side switch US is conducted, the input voltage VIN charges via the inductor L and the comparing voltage OTASO is decreased to be smaller than the enhanced feedback voltage OTAOT. After the time period TON1, the buffer BUF increases the comparing voltage OTASO via the resistor R2 and the capacitor C1 till the comparing voltage OTASO is greater than the enhanced feedback voltage OTAOT. That is, the present invention utilizes the control signal CON to generate the virtual ripple on the comparing voltage OTASO, for simulating the variations of the inductor current IL of the inductor L. Via repeating the above procedures, the voltage converting device 20 can generate the accurate and stable output voltage VOUT.

Figure 3:
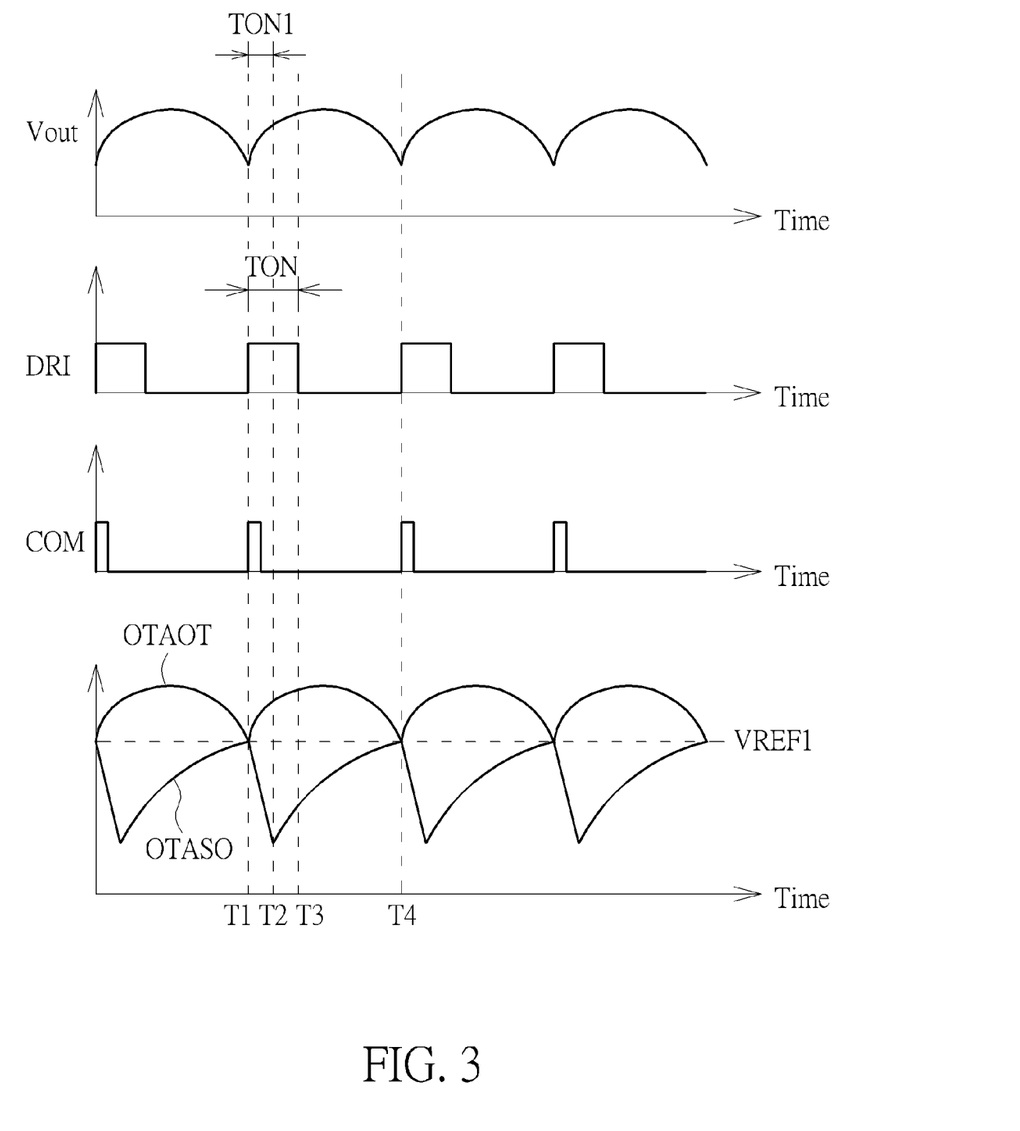
FIG. 3 is a schematic diagram of related signals when the voltage converting device shown in FIG. 2 operates.

Please refer to FIG. 3, which is a schematic diagram of related signals when the voltage converting device 20 shown in FIG. 2 operates. As shown in FIG. 3, a pulse is generated on the comparing signal COM and a pulse with the time period TON is generated on the driving signal DRI at a time T1. The high side driving signal UG becomes the high logic level and the low side driving signal LG becomes the low logic level for conducting the high side switch US and disconnect the low side switch LS, respectively. In such a condition, the inductor current IL starts rising for increasing the output voltage VOUT and the enhanced feedback voltage OTAOT increases with the output voltage VOUT. The pulse on the control signal CON conducts the switch SW for decreasing the comparing voltage OTASO. After the time period TON1 (i.e. at a time T2), the control signal CON is switched to the low logic level and the buffer generating the reference voltage VREF1' increases the comparing voltage OTASO via the resistor R2 and the capacitor C1. At a time T3, the driving signal DRI is switched to the low logic level, and the high side driving signal UG and the low side driving signal LG are switched to disconnect the high side switch US and to conduct the low side switch LS, respectively. Finally, the comparing voltage OTASO exceeds the enhanced feedback voltage OTAOT and the comparing signal COM is switched again at a time T4, and so on.

Please note that, when a switching frequency of the voltage converting device 20 is fixed, the comparing voltage OTASO and the enhanced feedback voltage OTAOT can intersect at the reference voltage REF1 (as shown in FIG. 3) via appropriately designing the resistance of the resistor R2 and the capacitance of the capacitor C1, such that the output voltage VOUT can be stable at the design value. In such a condition, if the switching frequency of the voltage converting device 20 increases, an offset voltage is generated between the reference voltage the voltage of the intersection of the comparing voltage OTASO and the enhanced feedback voltage OTAOT. The offset voltage may result in the output voltage VOUT generated by the voltage converting device 20 deviates from the design value.

Figure 4:
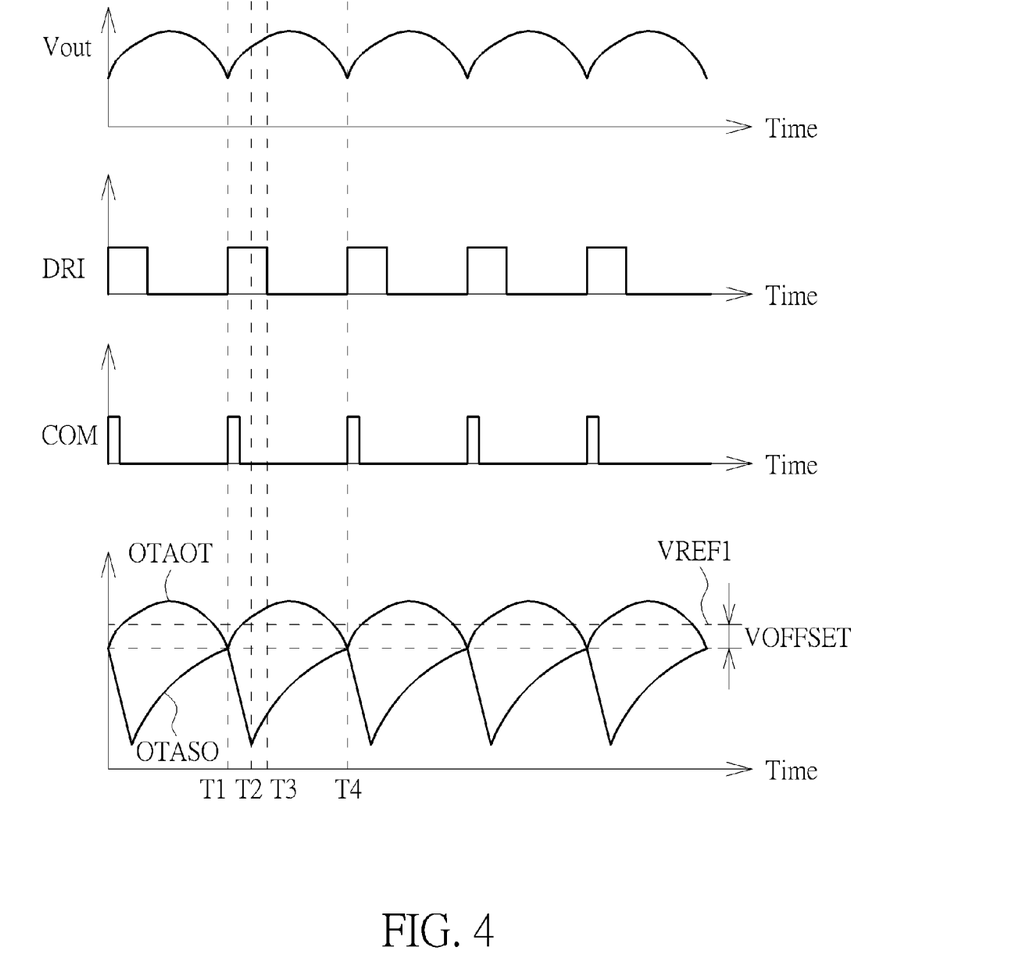
FIG. 4 is another schematic related signals when the voltage converting device shown in FIG. 2 operates.

Please refer to FIG. 4, which is a schematic diagram of related signals when the voltage device 20 shown in FIG. 2 operates. In comparison with FIG. 3, the switching frequency of the voltage converting device 20 is greater in FIG. 4. As shown in FIG. 4, when the voltage converting device 20 enters the stable state, an offset voltage VOFFSET is generated between the reference voltage VREF1 and the voltage of the intersection of the comparing voltage OTASO and the enhanced feedback voltage OTAOT, resulting the output voltage VOUT deviates from the design value.

In order to avoid the abovementioned offset voltage VOFFSET effects the operations of the voltage converting device 20, the present invention adjusts the related signals used for generating the comparing signal COM according to the offset voltage VOFFSET, to eliminate the offset voltage VOFFSET. As a result, the voltage converting device of the present invention can generate the accurate and stable output voltage under different switching frequencies.

Figure 5:
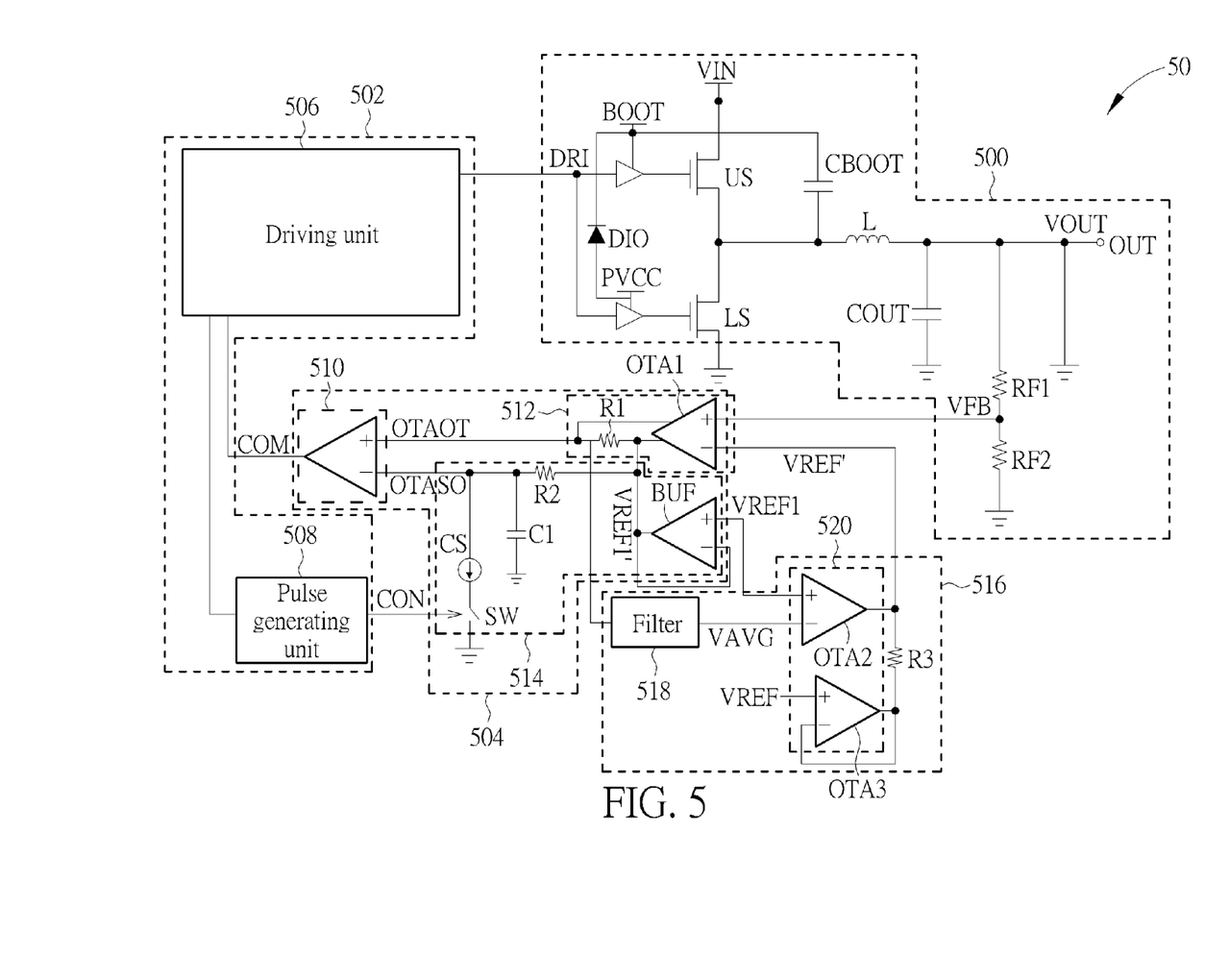
FIG. 5 is a schematic diagram of another voltage converting device according to an example of the present invention.

Please refer to FIG. 5, which is a schematic diagram of a voltage converting device 50 according to an example of the present invention. The voltage converting device 50 is similar to the voltage converting device 20, thus the components and signals of similar function utilize the same symbols. As shown in FIG. 5, the voltage converting device 50 comprises a voltage converting module 500, a driving module 502 and a control module 504. The voltage converting module 500 comprises a high side switch US, a low side switch LS, a diode DIO, a boot-strap capacitor CBOOT, an inductor L, an output capacitor COUT and resistors RF1 and RF2. The voltage converting module 500 generates an output voltage VOUT at an output end OUT according to a driving signal DRI and an input voltage VIN and generates a feedback voltage VFB according to the output voltage VOUT and a ratio between the resistors RF1 and RF2. The driving module 502 comprises a driving unit 506 and a pulse generating unit 508, for generating the driving signal DRI used for controlling the high side switch US and the low side switch LS and a control signal CON according to a comparing signal COM. The control module 504 comprises a comparing unit 510, a feedback voltage generating unit 512, a comparing voltage generating unit 514 and an adjusting unit 516, for generating the comparing signal COM according to the feedback voltage VFB, reference voltages VREF and VREF1 and the control signal CON. Via the feedback path composed of the voltage converting module 500, the driving module 502 and the control module 504, the voltage converting device 50 can generate the accurate and stable output voltage VOUT. The detailed operations of the feedback path composed of the voltage converting module 500, the driving module 502, the comparing unit 510, the feedback voltage generating unit 512 and the comparing voltage generating unit 514 can be referred to the related descriptions of the voltage converting device 20, and are not narrated herein for brevity.

Different from the voltage converting device 20, when the resistance of the resistor R2 and the capacitance of the capacitor C1 are optimized according to a specific switching frequency and the switching frequency of the voltage converting device 50 increases to another switching frequency from the specific switching frequency, the adjusting unit 516 of the control module 504 adjusts the reference voltage VREF' inputted into the feedback voltage generating unit 512 (corresponding to the reference voltage VREF of the voltage converting device 20 shown in FIG. 2) according to the voltage difference between the enhanced feedback voltage OTAOT and the reference voltage VREF1 (i.e. the offset voltage VOFFSET shown in FIG. 4), for avoiding the output voltage VOUT of the voltage converting device 50 deviates from the design value.

In detail, the adjusting unit 516 comprises a filter 518 and a level adjusting circuit 520. The filter 518 is coupled to the enhanced feedback voltage OTAOT for acquiring an average of the enhanced feedback voltage OTAOT as an average voltage VAVG. The level adjusting circuit 520 is coupled to the filter 518 for acquiring a sum of the reference voltage VREF and the voltage difference between the average voltage VAVG and the reference voltage VREF1 as the reference voltage VREF' outputted to the feedback voltage generating unit 512. Since the threshold used for comparing to the feedback voltage VFB increases (i.e. increases to the reference voltage VREF' from the reference voltage VREF), the voltage of the intersection of the enhanced feedback voltage OTAOT and the comparing voltage OTASO can back to the reference voltage VREF1. In other words, via adjusting the reference voltage VREF' outputted to the feedback voltage generating unit 512 according to the voltage difference between the average voltage VAVG and the reference voltage VREF1, the output voltage VOUT can be avoided deviating from the design value.

According to different applications and design concepts, the implementation methods of the filter 518 and the level adjusting circuit 520 are various. For example, the filter 518 can be a low-pass filter composed of resistors and capacitors. The level adjusting 520 may be realized by amplifiers OTA2 and OTA3 and a resistor R3 as shown in FIG. 5. The amplifier OTA2 comprises a positive input end coupled to the reference voltage VREF1, a negative input end coupled to the average voltage VAVG and an output end coupled to an end of the resistor R3. The amplifier OTA3 comprises a positive input end coupled to the reference voltage VREF, a negative input end and an output end both coupled to another end of the resistor R3. In such a condition, the level adjusting circuit 520 can acquire the sum of the reference voltage VREF and the voltage difference between the average voltage VAVG and the reference voltage VREF1 as the reference voltage VREF'. The operation methods of the level adjusting circuit 520 shown in FIG. 5 should be well-known to those with ordinary skill in the art, and are not narrated herein for brevity.

Figure 6A:
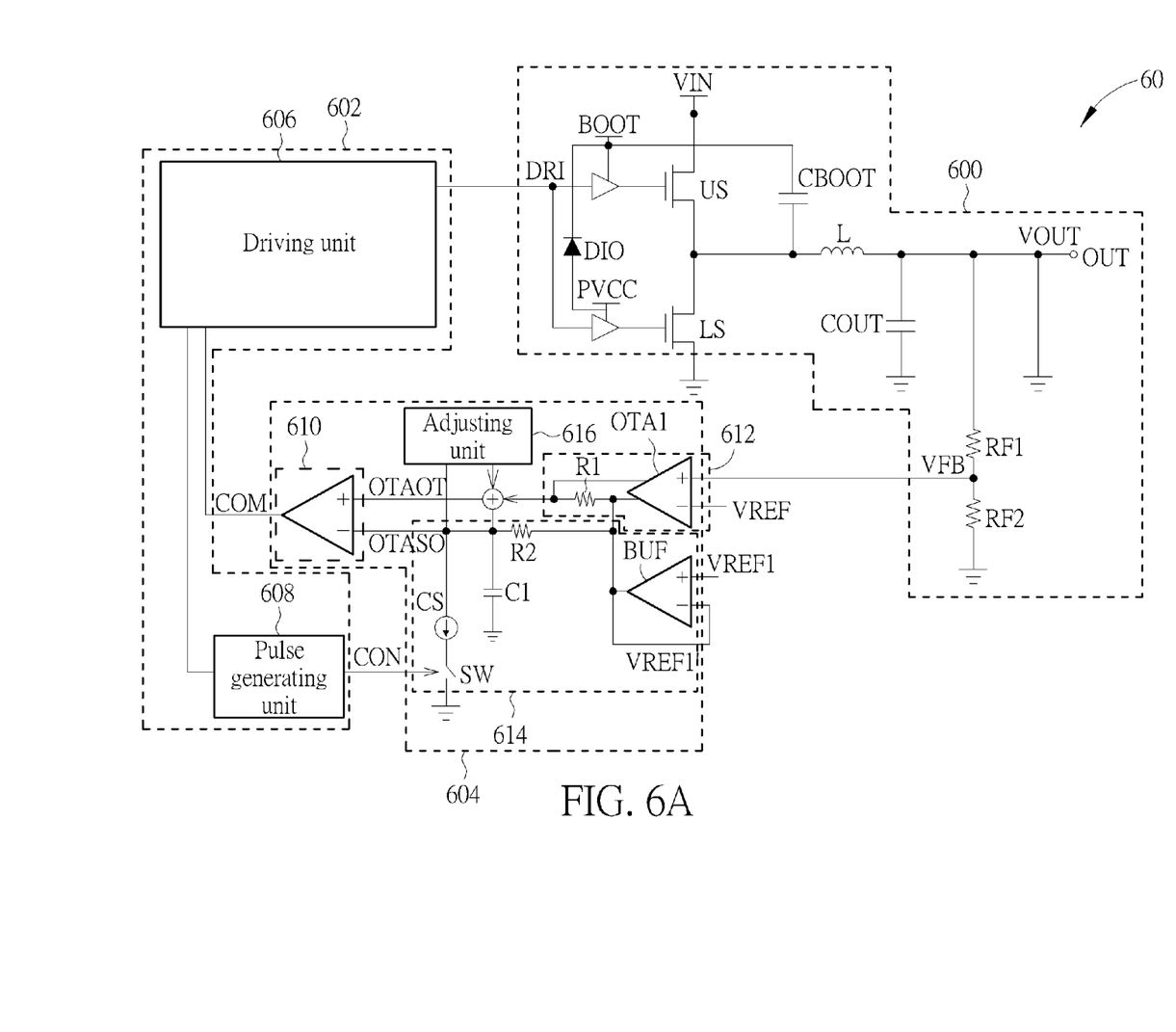
FIG. 6A is a schematic diagram of still another voltage converting device according to an example of the present invention.

Please refer to FIG. 6A, which is a schematic diagram of a voltage converting device 60 according to an example of the present invention. The voltage converting device 60 is similar to the voltage converting device 50, thus the components and signals with the similar functions use the same symbols. As shown in FIG. 6, the voltage converting device 60 comprises a voltage converting module 600, a driving module 602 and a control module 604. The voltage converting module 600 comprises a high side switch US, a low side switch LS, a diode DIO, a boot-strap capacitor CBOOT, an inductor L, an output capacitor COUT and resistors RF1 and RF2. The voltage converting module 600 generates an output voltage VOUT at an output end OUT according to a driving signal DRI and an input voltage VIN and generates a feedback voltage VFB according to the output voltage VOUT and a ratio between the resistors RF1 and RF2. The driving module 602 comprises a driving unit 606 and a pulse generating unit 608, for generating the driving signal DRI used for controlling the high side switch US and the low side switch LS and a control signal CON according to a comparing signal COM. The control module 604 comprises a comparing unit 610, a feedback voltage generating unit 612, a comparing voltage generating unit 614 and an adjusting unit 616, for generating the comparing signal COM according to the feedback voltage VFB, reference voltages VREF and VREF1 and the control signal CON. Via the feedback path composed of the voltage converting module 600, the driving module 602 and the control module 604, the voltage converting device 60 can generate the accurate and stable output voltage VOUT. As to the detailed operations of the feedback path composed of the voltage converting module 500, the driving module 602, the comparing unit 610, the feedback voltage generating unit 612 and the comparing voltage generating unit 614 can be referred to the related descriptions of the voltage converting device 20, and are not narrated herein for brevity.

Different from the voltage converting device 50, the voltage converting device 60 eliminates the offset voltage VOFFSET, which is generated by increasing the switching frequency, via adjusting the enhanced feedback voltage OTAOT. Please refer to FIG. 6B, which is a schematic diagram of a realization method of the adjusting unit 616 shown in FIG. 6A. In this example, the comparing voltage unit 614 is realized by a current source CS1 and transistors MP1-MP4, MN1 and MN2, wherein the voltage buffer BUF is composed of the transistors MP3, MP4 and MN2. Please note that, the switch SW and current source CS are not shown in FIG. 6B for convenience of illustrations. The adjusting unit 616 comprises a detecting circuit 618, a filter 620 and a level adjusting circuit 622. The detecting circuit 618 comprises transistors MN3-MN5 and MP5 for detecting the current passing through the resistor R2 and generating a gate voltage VGMN5 accordingly. The filter 610 comprises a resistor R4 and a capacitor C2 for generating an average voltage VAVG2 according to the gate voltage VGMN5. The level adjusting circuit 622 comprises transistors MN6, MN7, MP6 and MP7 for adjusting the enhanced feedback voltage OTAOT according to the average voltage VAVG2. That is, the adjusting unit 616 detects the average value of the current, which is generated by the buffer BUF due to the offset voltage VOFFSET, and adjusts the enhanced feedback voltage OTAOT according to the average value for eliminating the offset voltage VOFFSET.

Figure 6B:
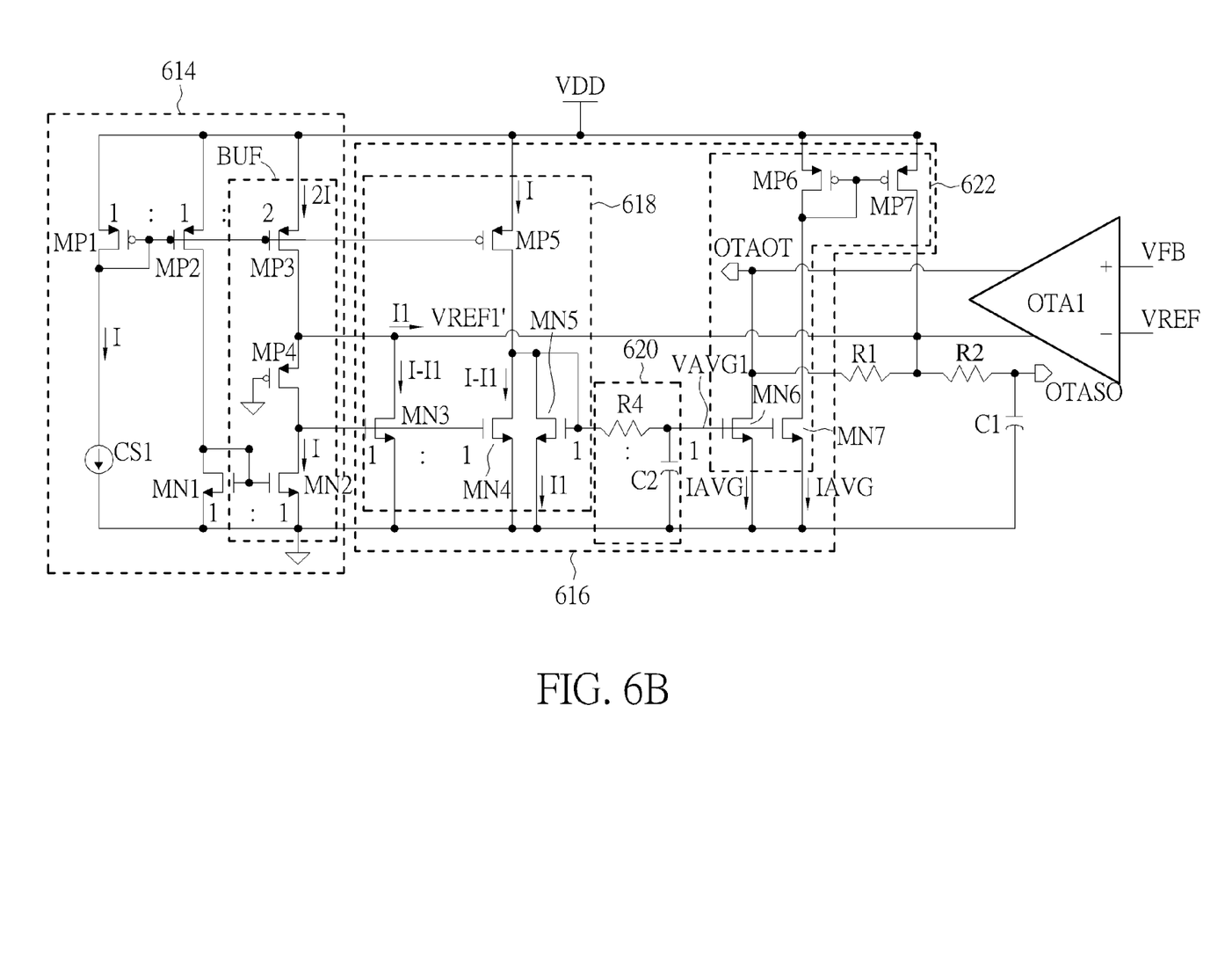
FIG. 6B is a schematic diagram of an realization method of the adjusting unit shown in FIG. 6A.

As to the detail operations of the adjusting unit 616 shown in FIG. 6B please refer to the following. The buffer BUF generates the reference voltage VREF1' according to the current I of the current source. The operation methods of the comparing voltage generating unit 614 should be well-known to those with ordinary skill in the art, and are not narrated herein for brevity. When the voltage converting device 60 enters stable status and the offset voltage VOFFSET exists between the reference voltage VREF1 and the voltage of the intersection of the enhanced feedback voltage OTAOT and the comparing voltage OTASO, the buffer BUF additionally generates a current I1 for charging the capacitor C1 through the resistor R2. In such a condition, since the current passing through the transistors MN3 and MN4 is the current I substrates the current I1 and the current passing through the transistor MP4 is the current I, the current passing through the transistor MN5 is the current I1. Next, the filter 618 acquires an average value of the gate voltage VGMN5 of the transistor MN5 via the low-pass filter composed of the resistor R4 and the capacitor C2. Since the transistors MN5-MN7 equips the same aspect ratio, the currents generated by the transistors MN6 and MN7 is an average current IAVG of the current I1. Via the current mirror composed of the transistors MP6 and MP7, the average current IAVG adjusts the enhanced feedback voltage OTAOT through the resistor R1. In short, the adjusting unit 616 adjusts the enhanced feedback voltage OTAOT according to the average current IAVG of the current I1 that is generated by the comparing voltage generating unit 614 (i.e. the buffer BUF) due to the offset voltage VOFFSET. The output voltage VOUT is avoided deviating from the design value, therefore.

Please note that, the above examples eliminates the offset voltage VOFFSET via adjusting the related signals used for generating the comparing signal COM (e.g. the reference voltage VREF and the enhanced feedback voltage OTAOT) according to the offset voltage VOFFSET, such that the voltage converting device can generate the stable and accurate output voltage VOUT. According to different applications and design concepts, those with ordinary skill in the art may observe appropriate alternations and modifications.

To sum up, the voltage converting devices of the above examples generates the stable and accurate output voltage via the constant on-time mode and the virtual ripple method. Further, the voltage converting devices of the above examples can eliminate the offset voltage generated by changing the switching frequency, to avoid the output voltage generated by the voltage converting device deviates from the design value. As a result, the voltage converting devices of the above examples can normally operate in different switching frequencies.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control module of constant on-time mode for a voltage converting device, the control module comprising: a comparing unit, comprising: a first positive input end, for receiving an enhanced feedback voltage; a first negative input end, for receiving a comparing voltage; and a first output end, for generating a comparing signal; a feedback voltage generating unit, for generating the enhanced feedback voltage according to a voltage difference between a first reference voltage and a feedback voltage corresponding to an output voltage of the voltage converting device; a comparing voltage generating unit, comprising: a first resistor, coupled between the first negative input end and a second reference voltage; a first capacitor, coupled to between the first negative input end and the ground; a current source, coupled to the first negative input end and a first end; and a switch, for controlling the connection between the first end and the ground according to a control signal of controlling the voltage converting device to adjust the output voltage; and an adjusting unit, coupled to the first positive input end and the second reference voltage for acquiring an average voltage of the enhanced feedback voltage and adjusting the first reference voltage to be a sum of a voltage difference between the average voltage and the second reference voltage and a third reference voltage.

2. The control module of claim 1, wherein the adjusting unit comprises: a filter, coupled to the first positive input end for acquiring the average voltage according to the enhanced feedback voltage; and a level adjusting circuit, coupled to the filter, the second reference voltage and the third reference voltage for acquiring a voltage difference between the average voltage and the second reference voltage and adding the voltage difference and the third reference voltage as the first reference voltage.

3. The control module of claim 2, wherein the level adjusting circuit comprises: a first amplifier, comprising a second positive input end coupled to the second reference voltage, a second negative input end coupled to the average voltage and a second output end coupled to the first reference voltage; a second amplifier, comprising a third positive input end coupled to the third reference voltage, a third negative input end and a third output end; and a second resistor, coupled between the second output end and the third negative input end and the third output end.

4. A voltage converting device, comprising: a voltage converting module, for generating an output voltage according to a driving signal and an input voltage and generating a feedback voltage according to the output voltage; a driving module, for generating the driving signal and a control signal according to a comparing signal; and a control module, comprising: a comparing unit, comprising: a first positive input end, for receiving an enhanced feedback voltage; a first negative input end, for receiving a comparing voltage; and a first output end, for generating the comparing signal; a feedback voltage generating unit, for generating the enhanced feedback voltage according to a voltage difference between a first reference voltage and the feedback voltage corresponding to the output voltage of the voltage converting device; a comparing voltage generating unit, comprising: a first resistor, coupled between the first negative input end and a second reference voltage; a first capacitor, coupled to between the first negative input end and the ground; a current source, coupled to the first negative input end and a first end; and a switch, for controlling the connection between the first end and the ground according to the control signal of controlling the voltage converting device to adjust the output voltage; and an adjusting unit, coupled to the first positive input end and the second reference voltage for acquiring an average voltage of the enhanced feedback voltage and adjusting the first reference voltage to be a sum of a voltage difference between the average voltage and the second reference voltage and a third reference voltage.

5. The voltage converting device of claim 4, wherein the adjusting unit comprises: a filter, coupled to the first positive input end for acquiring the average voltage according to the enhanced feedback voltage; and a level adjusting circuit, coupled to the filter, the second reference voltage and the third reference voltage for acquiring a voltage difference between the average voltage and the second reference voltage and adding the voltage difference and the third reference voltage as the first reference voltage.

6. The voltage converting device of claim 5, wherein the level adjusting circuit comprises: a first amplifier, comprising a second positive input end coupled to the second reference voltage, a second negative input end coupled to the average voltage and a second output end coupled to the first reference voltage; a second amplifier, comprising a third positive input end coupled to the third reference voltage, a third negative input end and a third output end; and a second resistor, coupled between the second output end and the third negative input end and the third output end.

* * * * *